United States Patent
Clark

(10) Patent No.: US 10,154,646 B2
(45) Date of Patent: Dec. 18, 2018

(54) MOLD HAVING MEASUREMENT MARKS

(71) Applicant: Kisha Clark, Aurora, CO (US)

(72) Inventor: Kisha Clark, Aurora, CO (US)

( * ) Notice: Subject to any disclaimer, the term of this patent is extended or adjusted under 35 U.S.C. 154(b) by 281 days.

(21) Appl. No.: 14/986,021

(22) Filed: Dec. 31, 2015

(65) Prior Publication Data
US 2017/0006820 A1    Jan. 12, 2017

Related U.S. Application Data

(63) Continuation-in-part of application No. 14/692,760, filed on Jul. 6, 2015.

(51) Int. Cl.
*A01J 19/00*    (2006.01)

(52) U.S. Cl.
CPC ................... *A01J 19/00* (2013.01)

(58) Field of Classification Search
CPC . A01J 19/00; A21B 3/138; A21B 3/13; A21B 3/132; A47G 19/26
USPC ..... 249/69, 119, 134, 160, DIG. 1, 66.1, 76; 206/459.1, 459.5; 426/87
See application file for complete search history.

(56) References Cited

U.S. PATENT DOCUMENTS

| | | | |
|---|---|---|---|
| 890,351 A | 6/1908 | Frank | |
| 2,232,918 A * | 2/1941 | Keefer | A01J 19/00 83/147 |
| 2,291,672 A * | 8/1942 | Youngberg | A01J 19/00 249/119 |
| D136,204 S | 8/1943 | Wade | |
| 2,340,369 A * | 2/1944 | Downer | A01J 19/00 206/459.5 |
| 2,370,925 A * | 3/1945 | Wade | A01J 19/00 249/104 |
| 2,433,211 A * | 12/1947 | Gits | A23G 9/221 206/551 |
| 2,642,820 A * | 6/1953 | Lund | A23G 9/26 426/279 |
| 2,747,525 A * | 5/1956 | Lund | A23G 9/26 426/249 |
| 2,796,742 A * | 6/1957 | Platt | F25C 1/24 249/127 |
| 2,802,267 A * | 8/1957 | Lackrie | A47G 19/26 83/437.2 |
| 3,162,884 A * | 12/1964 | Bordwine | A47G 19/26 222/386 |
| 3,253,929 A * | 5/1966 | Peters | A01J 19/00 426/104 |

(Continued)

OTHER PUBLICATIONS

Silcone Butter Keeper, located online at: "http://www.kingarthurflour.com/shop/items/silicone-butter-keeper", Sep. 14, 2015, 2 pgs.

(Continued)

*Primary Examiner* — Yogendra N Gupta
*Assistant Examiner* — Emmanuel S Luk

(57) ABSTRACT

A mold for forming materials such that the formed materials include measurement markings is disclosed herein. The mold includes multiple cavities, each of which has indentations for forming measurement markings on a material that is formed in the respective cavity. Each of the cavities may be further supported by one or more cavity-to-cavity support structures. The mold may also include a detachable lid for covering the contents of the mold during and after solidification.

20 Claims, 12 Drawing Sheets

(56) References Cited

U.S. PATENT DOCUMENTS

| | | | | |
|---|---|---|---|---|
| 3,268,111 | A * | 8/1966 | Duddy | A47G 19/26 |
| | | | | 206/229 |
| 3,374,982 | A * | 3/1968 | Sallade | F25C 1/24 |
| | | | | 249/121 |
| 3,410,699 | A * | 11/1968 | Peters | A01J 19/00 |
| | | | | 425/385 |
| 3,563,404 | A * | 2/1971 | Barchus | A47G 19/26 |
| | | | | 220/592.2 |
| 3,829,056 | A * | 8/1974 | Baker | F25C 1/243 |
| | | | | 220/315 |
| D245,985 | S * | 10/1977 | Talbert | D15/90 |
| D255,634 | S * | 7/1980 | Zuck | D7/673 |
| 4,222,547 | A * | 9/1980 | Lalonde | F25C 1/243 |
| | | | | 249/120 |
| D261,214 | S * | 10/1981 | Oelzner | D7/502 |
| 5,421,663 | A * | 6/1995 | Bravo | A47G 19/303 |
| | | | | 222/391 |
| 5,976,588 | A * | 11/1999 | Vincent | A23G 9/00 |
| | | | | 249/130 |
| 6,093,430 | A * | 7/2000 | Gupta | B65D 75/327 |
| | | | | 206/232 |
| 6,698,336 | B1 * | 3/2004 | Siegel | A21B 3/137 |
| | | | | 220/573.1 |
| 7,014,162 | B2 * | 3/2006 | Lion | F25C 1/24 |
| | | | | 249/121 |
| 8,146,469 | B2 * | 4/2012 | Parr | A21B 3/135 |
| | | | | 206/459.1 |
| D706,316 | S * | 6/2014 | Hoyord | D15/90 |
| 8,960,441 | B1 * | 2/2015 | Marquis | A47G 19/26 |
| | | | | 206/525 |
| 2001/0046534 | A1 * | 11/2001 | Green | B65D 77/00 |
| | | | | 426/87 |
| 2003/0071188 | A1 * | 4/2003 | Bruno | A21B 3/133 |
| | | | | 249/134 |
| 2003/0148010 | A1 * | 8/2003 | Keese | A21B 3/132 |
| | | | | 426/505 |
| 2004/0004017 | A1 * | 1/2004 | Schmitt | A47J 47/02 |
| | | | | 206/459.5 |
| 2004/0011216 | A1 * | 1/2004 | Jodrey | A47G 19/26 |
| | | | | 99/348 |
| 2004/0011690 | A1 * | 1/2004 | Marfino | A21B 3/13 |
| | | | | 206/459.1 |
| 2005/0151049 | A1 * | 7/2005 | Lion | F25C 1/24 |
| | | | | 249/121 |
| 2005/0199132 | A1 * | 9/2005 | Meeks | A21B 3/136 |
| | | | | 99/426 |
| 2005/0247212 | A1 * | 11/2005 | Meeks | A21B 3/136 |
| | | | | 99/426 |
| 2007/0235627 | A1 * | 10/2007 | Leach | A21B 3/132 |
| | | | | 249/121 |
| 2007/0284505 | A1 * | 12/2007 | Kaposi | A21B 3/136 |
| | | | | 249/144 |
| 2011/0088567 | A1 * | 4/2011 | Deroulers | A21B 3/138 |
| | | | | 99/426 |
| 2012/0321767 | A1 * | 12/2012 | Braden | A21B 3/132 |
| | | | | 426/303 |
| 2014/0116264 | A1 * | 5/2014 | Hauser | A21B 3/138 |
| | | | | 99/426 |

OTHER PUBLICATIONS

"Cannaware Butter Stick Mold", Internet Archive WayBackMachine, located online at: https://web.archive.org/web/20140406114430/http://www.cannawareproducts.com/, Apr. 6, 2014, 1 pg.
"The Best Butter Dish Ever", Mrs. Sell's Blog of Household Management, located online at: https://householdmanagementblog.wordpress.com/category/storage/page/2/, Sep. 14, 2015, 8 pgs.
"Cannaware Products & Molds", Facebook, Mar. 19, 2014, 1 pg.
"B is for Butter Making", Ozark Ramblings, located online at: http://oramblings.blogspots.com/2012_03_01_archive.html?_sm_au_=iVV21SQMn3ts223M, Mar. 1, 2012, pp. 20-25.
"Allforhome Mold 12 Cavities Rectangle Silicone DIY Moulds Chocolate Molds", obtained online at: http://www.amazon.com/Allforhome-Cavities-Rectangle-Silicone-Chocolate/dp/B00BK308O0, Oct. 14, 2015, 6 pgs.
"Finally have a mold for standard butter sticks!—Incredible, Edible Herb", located online at: http://forum.grasscity.com/incredible-edible-herb/1281484-finally-have-mold-standard-butter-sticks.html, Sep. 14, 2005, 9 pgs.

* cited by examiner

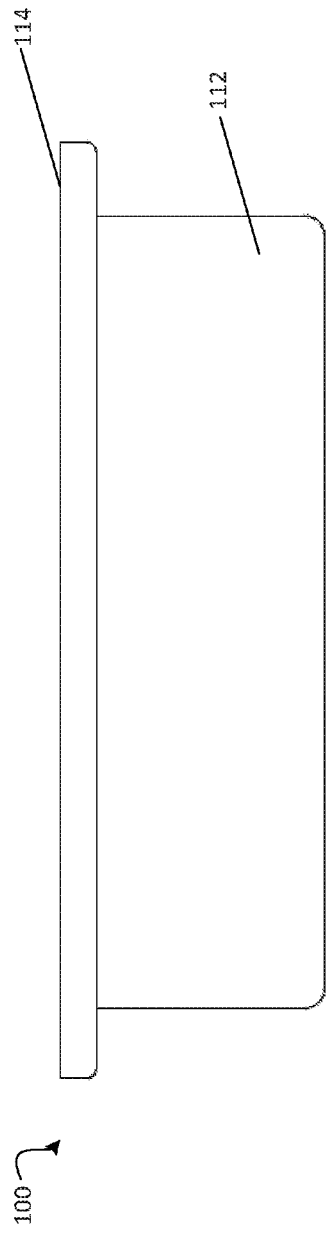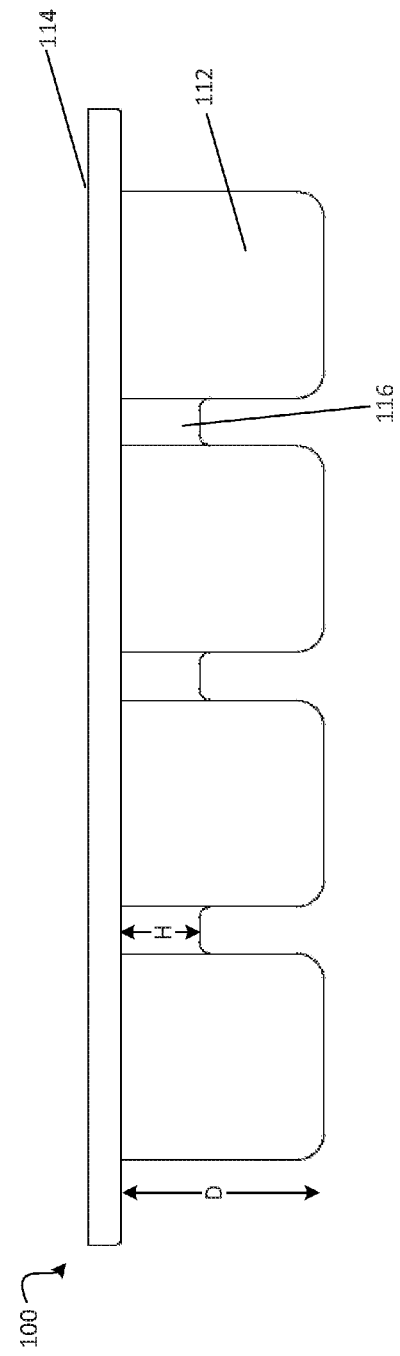

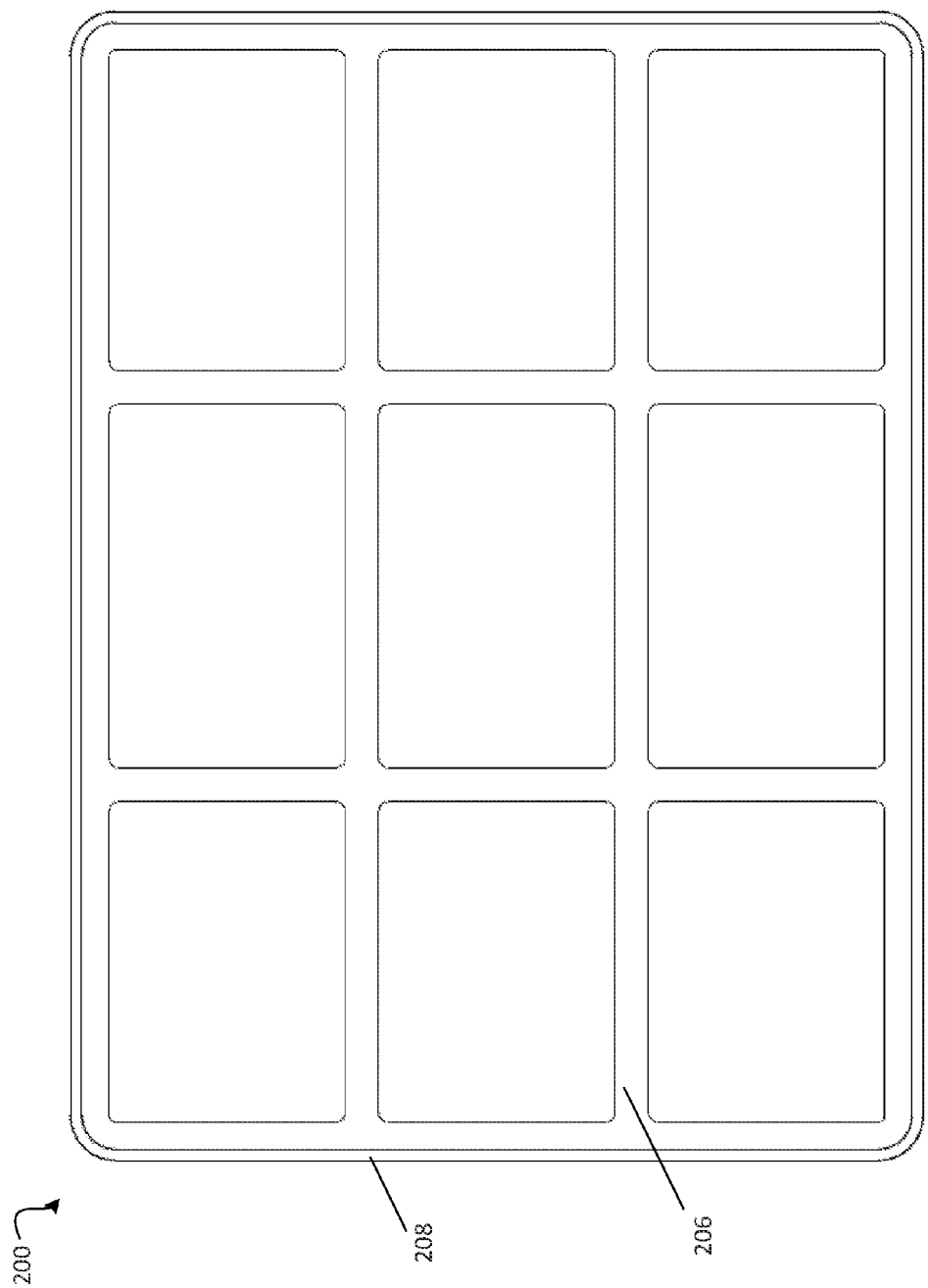

MOLD HAVING MEASUREMENT MARKS

PRIORITY CLAIM

The present application is a Continuation-In-Part of U.S. patent application Ser. No. 14/692,760, filed on Jul. 6, 2015, the disclosure of which is incorporated by reference in its entirety.

BACKGROUND

Forming materials into desired shapes can be accomplished by using molds. By altering the shape of a mold, the shape of the molded material can be changed.

SUMMARY

In once aspect, the technology relates to a silicon mold including a first cavity and a second cavity for receiving a moldable material, the first cavity and the second cavity each having a cavity surface defining multiple measurement marking indentations, wherein the first cavity and the second cavity are connected by an interior connection surface. The mold further includes a first cavity-to-cavity support structure attached to an exterior of the first cavity and an exterior of the second cavity and extending between the exterior of the first cavity and the exterior of the second cavity. In an embodiment, the interior connection surface defines a first cavity overflow wall surrounding the first cavity and a second cavity overflow wall surrounding the second cavity. In another embodiment, at least one of the measurement marking indentations has a different depth than at least one other measurement marking indentation. In yet another embodiment, the silicon mold has a support-height-to-cavity-depth ratio of approximately 2:5. In still another embodiment, the first cavity includes seven substantially evenly spaced measurement marking indentations, wherein each measurement marking indentation includes a text stamp.

In another embodiment of the above aspect, the first cavity and the second cavity each have a size configured to hold four ounces of moldable material. In an embodiment, the mold further includes a third cavity and fourth cavity, the third cavity and the fourth cavity each defining multiple measurement marking indentations, wherein the third cavity and the fourth cavity are connected by the interior connection surface. In that embodiment, the mold also includes a second cavity-to-cavity support structure attached to the exterior of the second cavity and an exterior of the third cavity and extending between the exterior of the second cavity and the exterior of the third cavity; and a third cavity-to-cavity support structure attached to the exterior of the third cavity and an exterior of the fourth cavity and extending between the exterior of the third cavity and the exterior of the fourth cavity. In another embodiment, the sizes of the cavities are each configured to hold four ounces of butter. In yet another embodiment, each cavity includes seven substantially evenly-spaced substantially evenly spaced measurement marking indentations, wherein each measurement marking indentation is configured to indicate one tablespoon on a molded material made using the silicon mold. In still another embodiment, the mold also includes a fourth cavity-to-cavity support structure attached to the exterior of the first cavity and the exterior of the second cavity and extending between the exterior of the first cavity and the exterior of the second cavity; a fifth cavity-to-cavity support structure attached to the exterior of the second cavity and the exterior of the third cavity and extending between the exterior of the second cavity and the exterior of the third cavity; and a sixth cavity-to-cavity support structure attached to the exterior of the third cavity and the exterior of the fourth cavity and extending between the exterior of the third cavity and the exterior of the fourth cavity.

In another embodiment of the above aspect, the mold also includes a seventh cavity-to-cavity support structure attached to the exterior of the first cavity and the exterior of the second cavity and extending between the exterior of the first cavity and the exterior of the second cavity; a eighth cavity-to-cavity support structure attached to the exterior of the second cavity and the exterior of the third cavity and extending between the exterior of the second cavity and the exterior of the third cavity; and a ninth cavity-to-cavity support structure attached to the exterior of the third cavity and the exterior of the fourth cavity and extending between the exterior of the third cavity and the exterior of the fourth cavity. In an embodiment, each of the measurement marking indentations have a width of approximately 0.5 mm to 3 mm. In another embodiment, each of the measurement marking indentations have a depth of approximately 0.1 mm to 1 mm. In yet another embodiment, the mold also includes an exterior lid-support surface attached to the interior connection surface, wherein the exterior lid-support surface defines an aggregate overflow wall. In still another embodiment, the exterior lid support surface further defines at least one lid-support indentation.

In another embodiment of the above aspect, the mold includes a detachable lid, wherein the detachable lid includes at least one lid support structure. In another aspect, the mold also includes a fill ridge for each cavity, wherein the fill ridge is attached to a cavity overflow wall.

In another aspect, the technology relates to a mold for forming a material into a shape having one or more measurement markings thereon. The mold includes four cavities, each cavity having multiple measurement marking indentations, wherein each cavity is connected to each other cavity by an interior connection surface; and at least six cavity-to-cavity support structures, wherein each cavity-to-cavity support structure is connected on one end to a an exterior of one of the four cavities and connected on another end to another one of the four cavities.

In yet another aspect, the technology relates to a mold for forming a material into a shape having one or more measurement markings thereon, the mold comprising a cavity having multiple measurement marking indentations, wherein each measurement marking indentation includes a text stamp indicating a measurement delineation, and wherein the cavity is configured to receive approximately two cups of the material.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 1C depicts a side view of the mold of FIG. 1A.
FIG. 1D depicts a front view of the mold of FIG. 1A.

FIG. 2E depicts a bottom view of the lid of FIG. 2A.

DETAILED DESCRIPTION

Figure 1A:
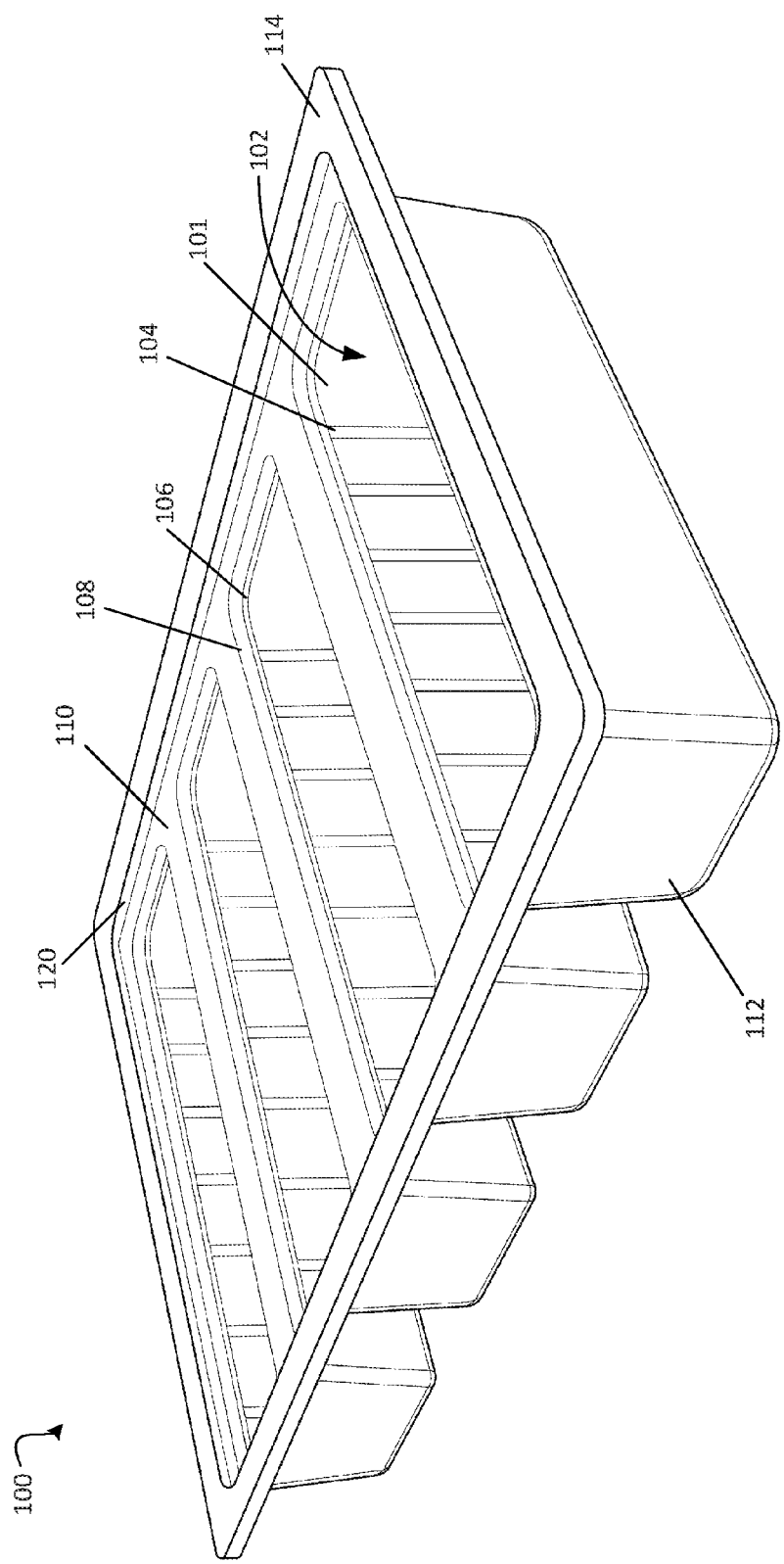
FIG. 1A depicts a perspective view of a mold in accordance with an example of the present technology.
Figure 1B:
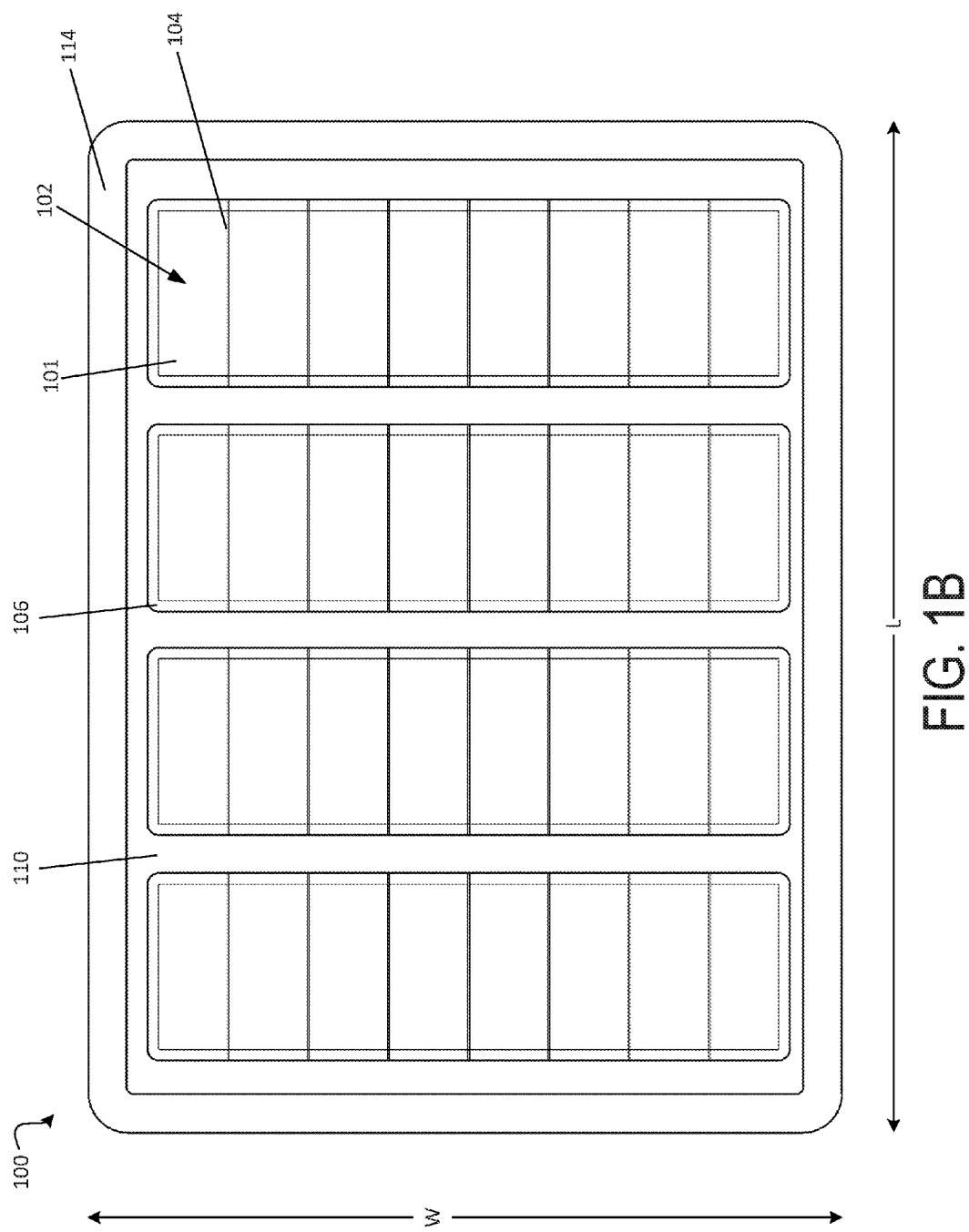
FIG. 1B depicts a top view of the mold of FIG. 1A.
Figure 1E:
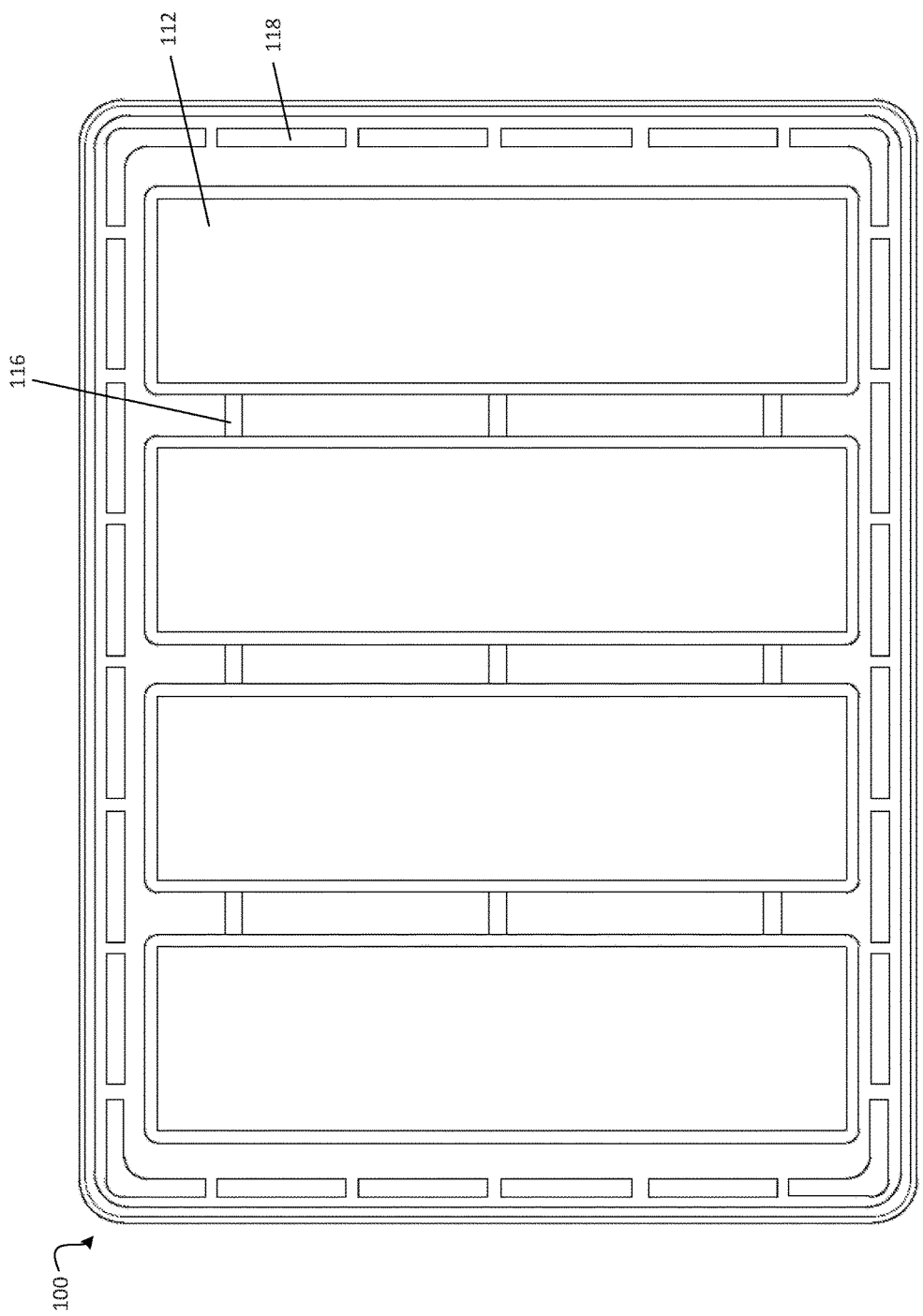
FIG. 1E depicts a bottom view of the mold of FIG. 1A.

The technologies described herein contemplate a mold for forming items having one or more measurement lines incorporated thereon. For example, liquid butter may be poured into a hollow cavity of the mold, and upon hardening, the butter will have at least one or more measurement markings formed thereon, such as tablespoon measurement markings. While the mold is primarily discussed for use in forming butter, butter is only one type of item for which the mold may be used. Any type of food or other material that can be melted and poured into the mold would be suitable for use, including soaps and confection-related foods, such as chocolate.

FIGS. 1A-1E depict an example of a mold 100 and are described simultaneously. The mold 100 has at least two hollow cavities 102. Each hollow cavity 102 is defined by a cavity surface 101. Within each hollow cavity 102 are one or more measurement marking indentations 104. The measurement marking indentations 104 may be created by forming the cavity surface 101 so as to form the measurement marking indentations 104. The measurement marking indentations 104 are generally linear and extend across the bottom and both walls of the cavity 102. For example, as depicted in FIGS. 1A-1E, the mold 100 may include four separate hollow cavities 102, each having seven measurement marking indentations 104. In that example, each hollow cavity 102 may be designed to receive four ounces of butter, which is the amount of butter generally found in one stick of commercially-sold butter. For a mold 100 having four four-ounce hollow cavities 102, the mold 100 may be used to make a pound of butter, i.e., sixteen ounces of butter. The measurement marking indentations 104 may be configured so as to convey any useful measurement information, depending on the particular application. As an example, where the hollow cavity 102 is configured to hold four ounces of butter, seven equally spaced measurement marking indentations 104 are incorporated into each hollow cavity 102. In that example, when the butter is formed and removed from the mold 100, it will have seven markings indicating eight separate tablespoon portions of butter— similar to the printed lines on the packaging of commercially-sold sticks of butter. As such, forming sticks of butter using the mold 100 removes the need to keep any packaging or measure any amount of butter because the measurement markings are incorporated directly on the butter itself. As should be understood, when the butter forms in the hollow cavity 102, a portion of the butter will flow into the measurement marking indentations 104, forming a small ridge on the butter when it hardens. In other examples of the present technology, the measurement marking indentations 104 may actually be protrusions into the hollow cavity 102, causing small indentations to form on the hardened butter rather than ridges. In yet other examples, some of the measurement marking indentations 104 may be indentations, while other measurement marking indentations 104 are protrusions. In such examples, the different types of measurement marking indentations 104 could be used to represent different types of measurements. For instance, a ridge may be used to represent the half point for the stick of butter, whereas the indentations may be used to indicate all other four-ounce markings. In examples, the width of the measurement marking indentations 104 may be from approximately 0.5 mm to 3 mm. The depth of the measurement marking indentations 104 may be from approximately 0.1 mm to 2 mm. The depth or width of the measurement marking indentations 104 may also vary within each cavity 102 to convey additional measurement information. For example, the measurement marking indentations 104 for a ⅛ of a stick may have a different width and/or depth than the measurement marking indentations 104 for a ¼ stick indication, which may yet have a different width and/or depth from the measurement marking indentations 104 indicating a ½ stick. Other configurations are contemplated, such as having measurement marking indentations 104 only for quarters of a stick of butter. In addition, the size and/or depth of the measurement marking indications may be altered to indicate a ¼ cup of butter and ⅓ cup of butter.

Depending on the desired shape of the hardened butter, the dimensions of the cavities 102 may be altered. For example, the cavity 102 may be configured so as to form a stick of butter having the approximate dimensions of 121 mm by 32 mm by 32 mm, corresponding to approximately 4 ounces of butter. Other sizes and shapes are also contemplated. As an example, each cavity 102 may be configured so as to have the following approximate dimensions: a length of 81 mm, a width of 39 mm, and a depth of 39 mm. Such an example also results in each cavity 102 forming approximately 4 ounces of butter, but having a different shape. The overall mold may also have different overall dimensions. For instance, as compared to a mold having the approximate dimensions of 121 mm by 32 mm by 32 mm, the mold having the approximate dimensions of a length of 81 mm, a width of 39 mm, and a depth of 39 mm, has a taller height as the cavities are deeper. Similarly, the overall length and width of the mold may also be smaller to accommodate the narrower and shorter cavities. The other components of the mold may be modified such that they retain the same relative locations as the mold having different dimensions. In another example, the cavity 102 is configured so as to have the following approximate dimensions: a length of 120 mm, a width of 65 mm, and a height of 65 mm. Such an example results in each cavity 102 forming approximately 16 ounces of butter.

Each cavity 102 may also have a fill ridge 106. The fill ridge 106 indicates the level to which the cavity 102 should be filled to achieve the proper or desired amount of butter in the mold 100. For example, the location of the fill ridge 106 may be configured such that filling the cavity 102 up to the fill ridge 106 results in four ounces of butter being formed in the cavity 102. A cavity overflow wall 108 may also be incorporated into the mold 100. The cavity overflow wall 108 is proximate to the fill ridge 106, such that a small portion of butter that flows onto the fill ridge 106 is prevented from flowing further throughout the mold 100.

Accordingly, the cavity overflow wall 108 prevents a portion of butter from flowing into other cavities 102.

The cavities 102 are connected to one another by an interior connection surface 110, which may also form the cavity overflow wall 108. At the edges of the interior connections surface is an aggregate overflow wall 120. The aggregate overflow wall 120 prevents a portion of butter from flowing outside of the mold 100 in the case that more butter is poured into each cavity 102 than the cavities 102 have a capacity to hold. The mold 100 may also include an exterior lid-support surface 114, which may also form the aggregate overflow wall 120.

Each cavity also has a cavity exterior 112 that may also form the base of the mold 100. For example, the mold 100 may be placed on a table or surface and be supported by the cavity exteriors 112. Each of the cavity exteriors 112 may be connected to another cavity exterior 112 by a cavity-to-cavity support structure 116. For example, one end of a cavity-to-cavity support structure 116 is attached to a first cavity exterior 112 and the other end of the cavity-to-cavity support structure 116 is attached to second cavity exterior 112. The cavity-to-cavity support structures 116 provide additional support for each cavity exterior 112. By including the cavity-to-cavity support structures 116, the mold 100 is more resistant to deformation upon liquid butter being added to the mold 100. In the example depicted in FIG. 1E, each cavity exterior 112 has attached to it three cavity-to-cavity support structures 116. Other amounts and configurations of cavity-to-cavity support structures 116 are also contemplated. For example, the number and configuration of the cavity-to-cavity support structures 116 depends on the construction of the mold 100 and type of material used to form the mold 100. In an example, the mold 100 is made of a silicon material and may be formed as a single component, such as by forming the mold 100 by using a separate mold that can receive silicon material to be formed in the shape and configuration of mold 100. The use of silicon as a material for the mold 100 allows for the mold 100 to be flexible so that the butter can be more easily removed once it solidifies in the mold 100. The incorporation and configuration of the cavity-to-cavity support structures 116 allow for additional stability to be added to the mold 100, while still retaining flexibility desired for removing butter from the mold 100. In some examples, lid-support indentations 118 may also be incorporated into the mold 100. The lid-support indentations 118 are incorporated into the underside of the exterior lid-support surface 114, and the lid-support indentations 118 may be configured to provide a desired amount of flexibility or stiffness to the exterior lid-support surface 114 such that a lid can be more easily attached and removed from the mold 100.

Additional support and flexibility may be adjusted by varying the thickness of material used to form each component of the mold 100. As an example, the cavity-to-cavity support structures 116 may have a thickness of approximately 2.5 mm. In such examples, the cavity-to-cavity support structure 116 may have a height H of approximately 14 mm, whereas the depth D of the cavity may be approximately 35 mm. The ratio of the height of the cavity-to-cavity support structure 116 to the depth of the cavity 102 may be referred to herein as the support-height-to-cavity-depth ratio. The support-height-to-cavity-depth ratio may range from approximately 1:10 to 1:1, and in the example discussed above, the support-height-to-cavity-depth ratio is approximately 2:5. The thickness of the material forming the cavity 102 may have a similar thickness as the thickness of the cavity-to-cavity support structure 116. The thickness of the exterior lid-support surface 114, however, may be thicker to fully support the lid. For instance, the lid support surface may have a thickness of approximately 5-10 mm. In examples, the length L of the mold 100 may be approximately 196 mm and the width W of the mold 100 may be approximately 146 mm. In examples, the length L to width W ratio may be approximately 3:4.

Figure 1F:
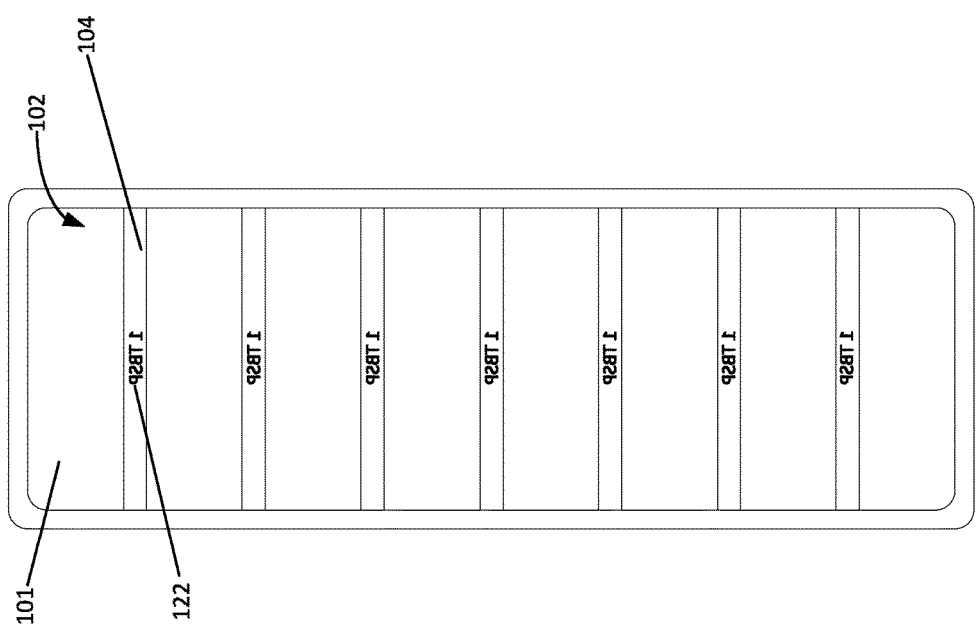
FIG. 1F depicts a top view of an example cavity of the mold of FIG. 1A in accordance with an example of the present technology.

The measurement marking indentations 104 may also include raised or indented text stamp 122, as shown in FIG. 1F. The text stamp 122 may be created by forming the cavity surface 101 such that it forms the desired text in the text stamp 122. As mentioned above, the text stamp 122 may be raised so as to indent the hardened butter with the text encompassed in the text stamp 122. In other examples, the text stamp 122 may be indented so as to form a ridge on the hardened butter with the text encompassed in the text stamp 122. As shown in FIG. 1F, the text in the text stamp 122 appears backwards so that when the text is formed on the hardened butter, it will read properly to a person viewing the hardened butter. The text in the text stamp 122 shown in FIG. 1F will read "1 TBSP" when formed on the hardened butter. Other text may include ounce or cup sizes indicated by each measurement marking indentation 104. In such examples, the text stamp 122 in each measurement marking indentation 104 for each cavity 102 may be different. In an example, the measurement marking indentations 104 corresponding to ¼ cup and ⅓ cup would include text stamps 122 indicating those particular measurement delineations.

Where the mold 100 is used to create food products, the material, such as silicon, forming the mold 100 should be selected such that it is non-toxic. For example, the silicon used in forming the mold 100 is approved by the Food and Drug Administration (FDA) and is free of bisphenol A (BPA). The silicon may also accept liquids ranging from −40 degrees Fahrenheit to 500 degrees Fahrenheit. Further, when forming the butter or other items, the material of the mold 100 should not contaminate the product which is being formed. In some examples, it may also be desirable that the material forming the mold 100 is microwave and dishwasher safe.

Figure 2A:
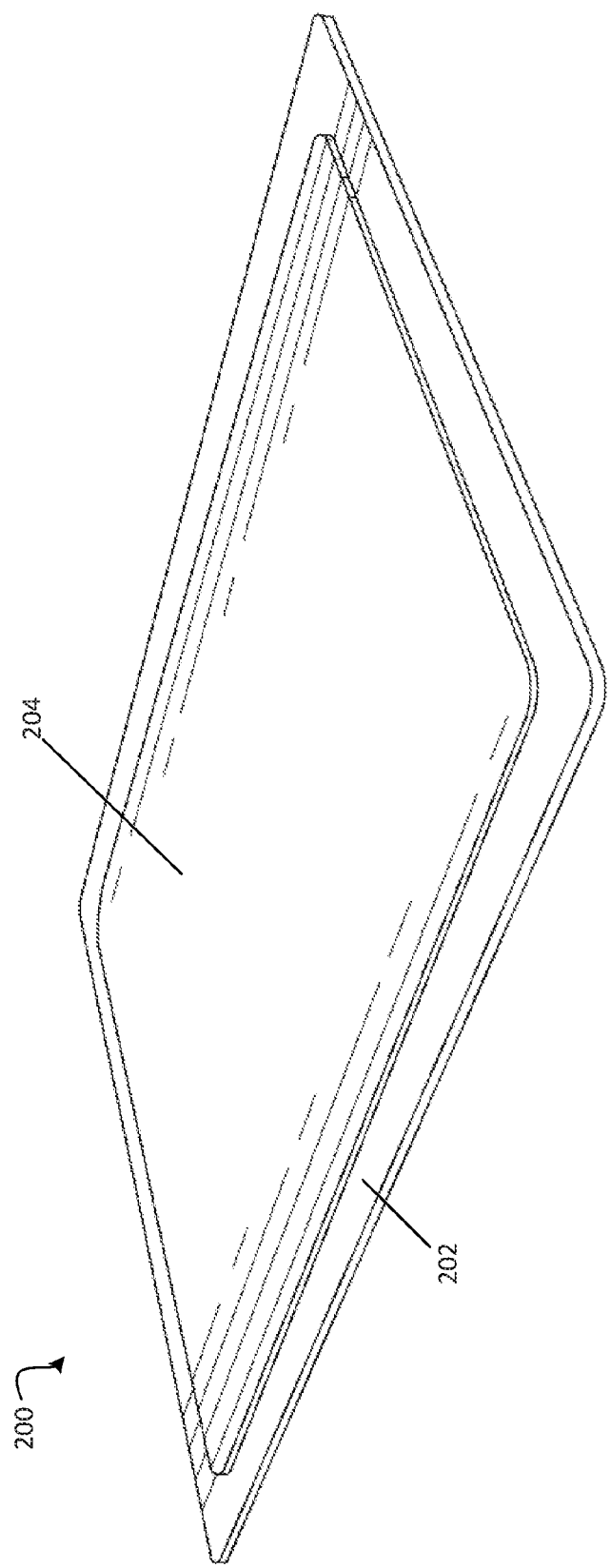
FIG. 2A depicts a perspective view of a lid for a mold in accordance with an example of the present technology.
Figure 2B:
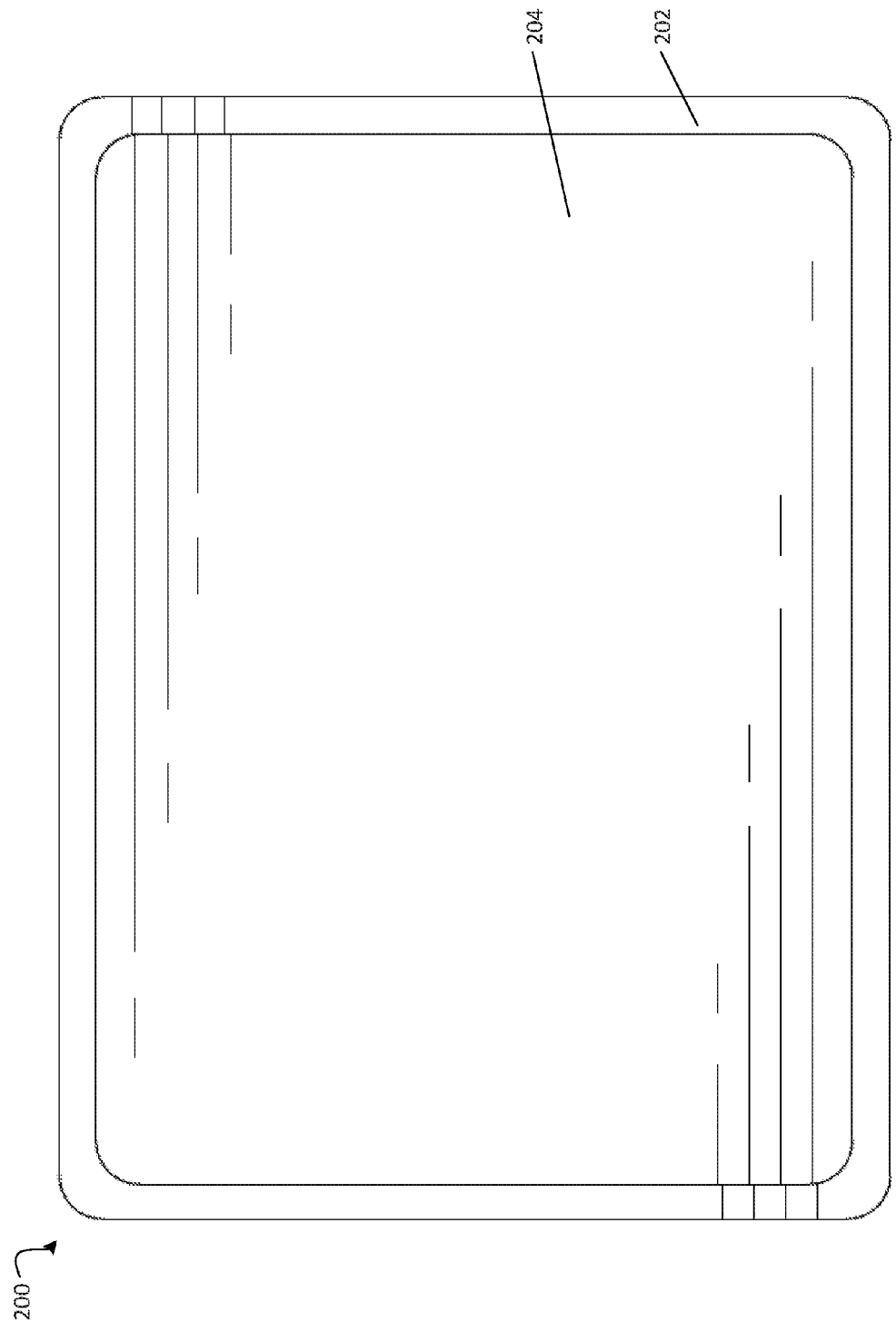
FIG. 2B depicts a top view of the lid of FIG. 2A.
Figure 2C:
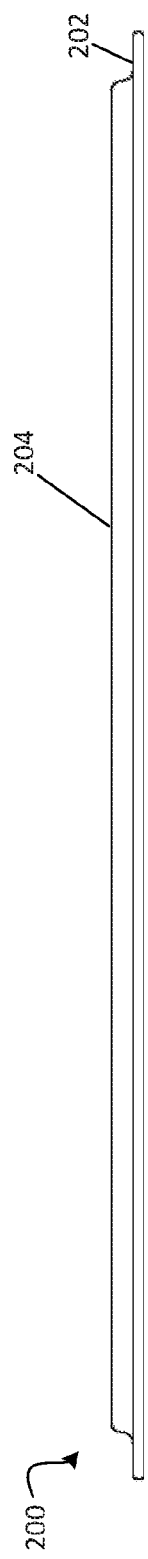
FIG. 2C depicts a front view of the lid of FIG. 2A.
Figure 2D:
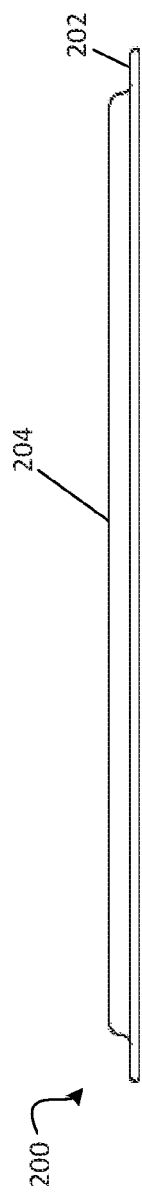
FIG. 2D depicts a side view of the lid of FIG. 2A.
Figure 3:
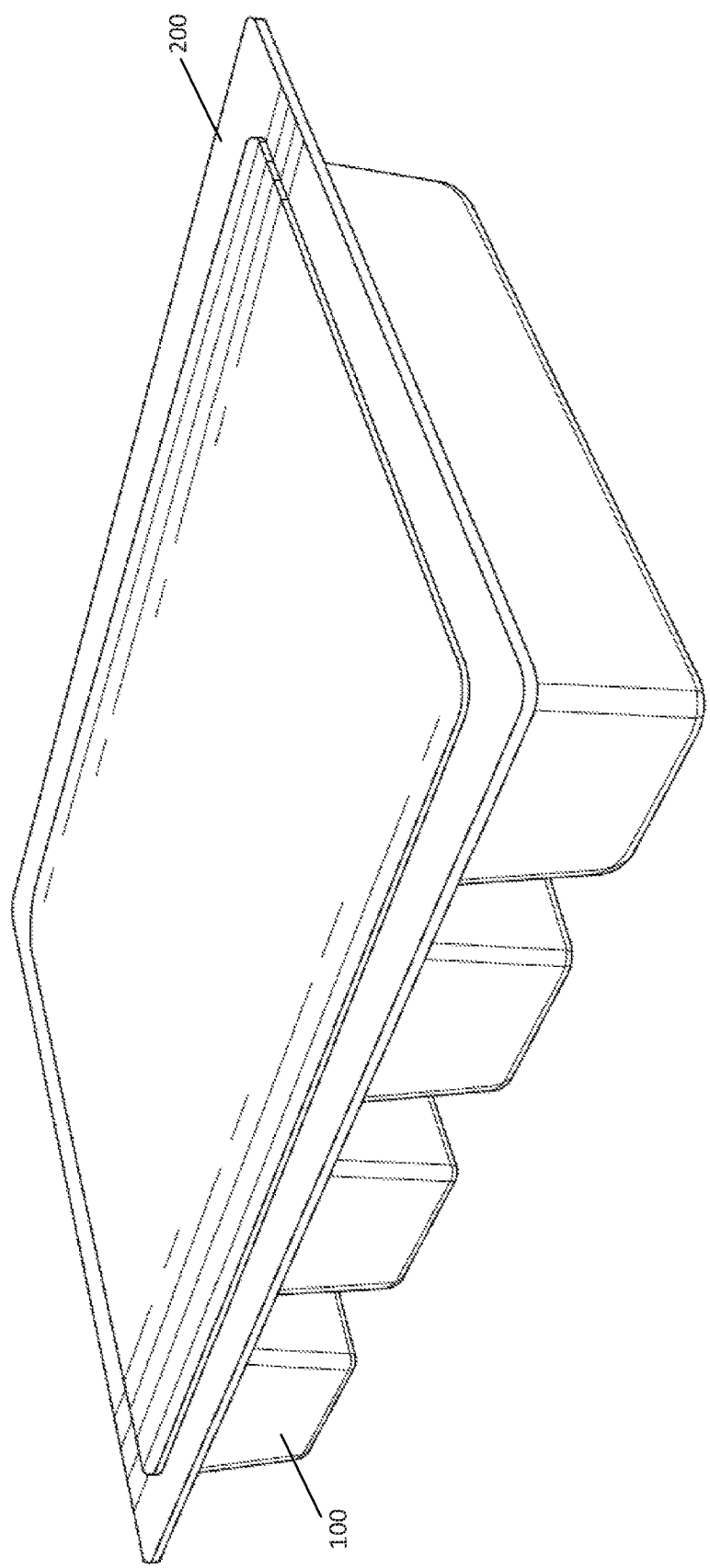
FIG. 3 depicts a perspective view of a mold having an attached lid in accordance with an example of the present technology.

FIGS. 2A-2E depict an example of a lid 200 for attaching to the mold 100, and are described simultaneously. The lid 200 is configured to attach to the mold 100 to keep the contents of the mold 100 covered and therefore keep contaminants out of the contents. The lid 200 includes a raised central portion 204 and an outer portion 202. The raised central portion 204 includes a lid support structure 206. The lid support structure 206 is a structure attached to or formed from the underside of the raised central portion 204. For example, the lid support structure 206 may be a raised structure forming a horizontal and vertical ridges, as shown in FIG. 2E. Other configurations are also contemplated. The lid support structure 206 provides additional support for the raised central portion 204 to help prevent the raised central portion 204 from falling into the contents of the mold 100. A connection ridge 208 is also attached to the underside of the outer portion 202 for connecting the lid 200 to the mold 100. FIG. 3 depicts a perspective view of the mold 100 having the lid 200 attached to the mold 100.

The composition and stiffness of the lid 200 may also depend on the particular application. For example, in some applications, the lid 200 is formed so as to have a stiffness sufficient to allow at least one other mold to be stacked on top of the lid 200 without the lid 200 flexing low enough to touch the butter in the cavities 102 or the interior connection surface 110. The stiffness of the lid 200 may be altered by changing the material of the lid 200, for instance to a stiffer silicon material than the mold 100. The stiffness of the lid 200 may also be altered by changing the thickness of the lid 200 or the size and configurations of the lid support structure 206.

Figure 4A:
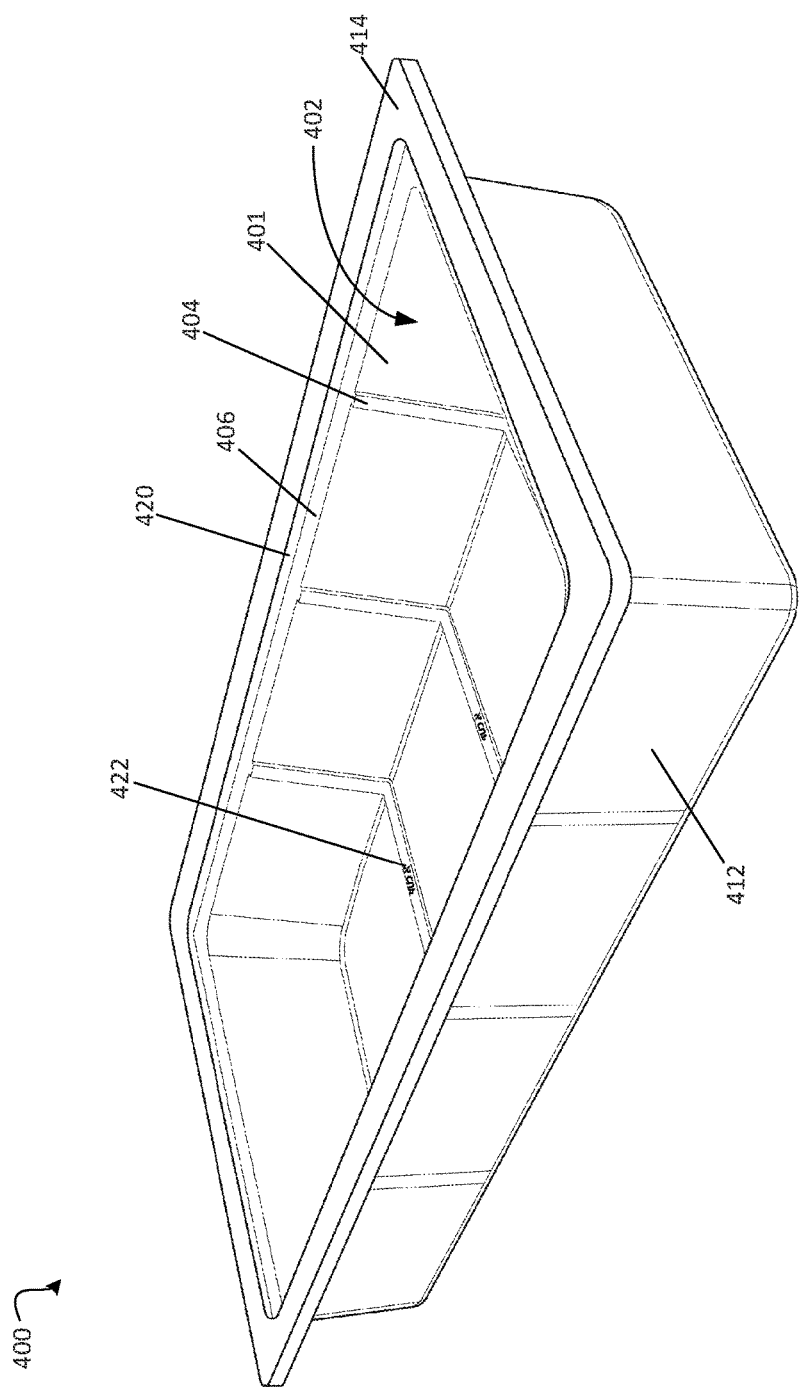
FIG. 4A depicts a perspective view of an example mold in accordance with the present technology.

FIG. 4A depicts another example of a mold 400 and are described. The mold 400 is similar to the mold 100 described above with reference to FIGS. 1A-1F. As such, many of the features and examples discussed above are also applicable to the mold 400. The mold 400 shown in FIG. 4A, however, has only a single cavity 402. The cavity 402 is defined by a cavity surface 401. The cavity surface 401 further defines several measurement marking indentations 404 that protrude into the cavity 402. Each measurement marking indentation 404 may also have a text stamp 422 that indicates a particular measurement delineation. The mold 400 further includes a fill ridge 406 connected to the cavity surface 401 and an overflow wall 420. The fill ridge 406 indicates the proper fill level for the butter when poured into the cavity 402. If the amount of butter poured into the cavity 402 exceeds the fill ridge 406, the overflow wall 420 prevents at least a portion of the butter from flowing outside of the mold 400. The mold 400 further includes an exterior lid-support surface 414 connected to the overflow wall 420. The mold 400 is supported by the cavity exterior 412.

Figure 4B:
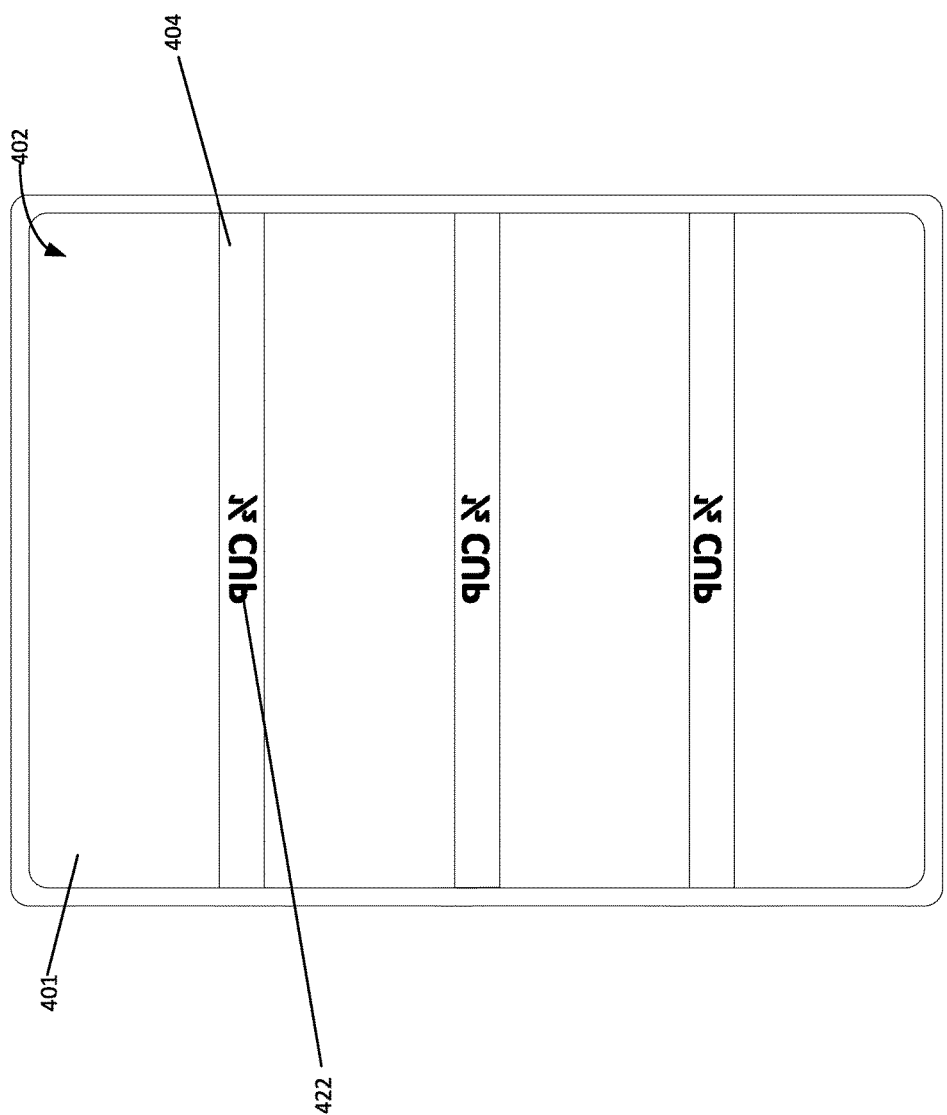
FIG. 4B depicts a top view of an example cavity of the mold of FIG. 4A in accordance with an example of the present technology.

In an example, the cavity 402 of the mold has the following approximate dimensions: 120 mm long, 65 mm wide, and 65 mm deep. With those dimensions, the mold 400 produces approximately 1 pound of butter. In such an example, the cavity 402 may include three measurement marking indentations 404, as shown in FIGS. 4A-4B. By including three measurement marking indentations 404, the resulting hardened butter will be formed into four sections, each corresponding to a half cup of butter. A text stamp 422 on the measurement marking indentations 404 may then be configured to as to imprint "½ CUP" onto the butter. The text stamp 422 may also be configured to alternatively or in addition to the "½ CUP" marking also imprint "4 OZ," which is also equivalent to a half cup of butter. In other examples, more or less measurement marking indentations 404 may be included in the cavity 402. In such examples, the text of the text stamp 422 would also change to indicate the different portion sizes of the butter as indicated by the measurement marking indentations 404. For instance, there may be anywhere from 4-10, or even more, measurement marking indentations 404. The measurement marking indentations 404 may also have different widths or heights to indicate different types of measurements, as discussed above with the measurement marking indentations 104 in FIGS. 1A-1F.

Like the mold 100 discussed above, the mold 400 is also configured to have a lid attached thereto. For instance, a lid such as lid 200 shown in in FIGS. 2A-2E may be attached to the mold 400. Depending on the particular application and dimensions of the mold 400, the lid 200 would be configured to have complimenting dimensions such that the lid can be properly attached to the exterior lid-support surface 414. The underside of the lid support surface 414 may also include lid-support indentations, such as lid support indentations 118 shown in FIG. 1E.

FIG. 4B depicts a top view of the cavity 402 defined by the cavity surface 401. In the example shown, each measurement marking indentation 404 includes a text stamp 422. In the example shown, the text stamp 422 includes the text "½ CUP" backwards so that the resulting stamp on the hardened butter reads properly to a viewer of the butter. Other configurations or text stamps 422 and measurement marking indentations 404 may be utilized, as discussed above.

Although specific embodiments and aspects were described herein and specific examples were provided, the scope of the invention is not limited to those specific embodiments and examples. In addition, the figures may not be drawn or printed to scale. Rather, the dimensions and other numerical figures of the mold have been described herein. Those dimensions are approximate dimensions. Further, the term "approximately" or "about" as used herein corresponds to a tolerance of 10% unless otherwise indicated or understood by one having skill in the art. One skilled in the art will also recognize other embodiments or improvements that are within the scope and spirit of the present invention. Also, while the above technology has been described as examples and embodiments, it should be understood that many of those examples and embodiments are combinable with one another. Therefore, the specific structure, acts, or media are disclosed only as illustrative embodiments. The scope of the invention is defined by the following claims and any equivalents therein.

The invention claimed is:

1. A silicon mold for molding a sliceable food product comprising:
   a first cavity and a second cavity for receiving a moldable material, the first cavity and the second cavity each having a cavity surface with a bottom, two side walls, and two end walls, wherein each cavity surface defines multiple measurement marking indentations, wherein each measurement marking indentation extends linearly across the two side walls and the bottom of the respective cavity surface and each measurement marking indentation configured to cause a visible marking on the sliceable food product of the respective measurement marking indentation indicating a measurement delineation for the sliceable food product directly on the sliceable food product itself, wherein the outer surfaces of the first cavity and the second cavity are spaced apart from one another;
   an interior connection surface connecting an upper portion of the first cavity to an upper portion of the second cavity;
   an aggregate overflow wall attached to and surrounding an outer perimeter of the interior connection surface;
   an exterior lid-support surface attached to and surrounding an outer perimeter of the aggregate overflow wall;
   a plurality of lid-support indentations incorporated into an underside of the exterior lid-support surface;
   a first cavity-to-cavity support structure attached to an exterior surface of a side wall of the first cavity and an exterior surface of a side wall of the second cavity and extending between the exterior of the first cavity and the exterior of the second cavity;
   a second cavity-to-cavity support structure attached to the exterior surface of the side wall of the first cavity and the exterior surface of the side wall of the second cavity and extending between the exterior of the first cavity and the exterior of the second cavity; and
   a third cavity-to-cavity support structure attached to the exterior surface of the side wall of the first cavity and the exterior surface of the side wall of the second cavity and extending between the exterior of the first cavity and the exterior of the second cavity.

2. The silicon mold of claim 1, wherein the interior connection surface defines a first cavity overflow wall surrounding the first cavity and a second cavity overflow wall surrounding the second cavity.

3. The silicon mold of claim 1, wherein at least one of the measurement marking indentations has a different depth into or out of the cavity than at least one other measurement marking indentation, wherein the different depth indicates a different measurement delineation.

4. The silicon mold of claim 1, wherein the silicon mold has a support-height-to-cavity-depth ratio of approximately 2:5.

5. The silicon mold of claim 1, wherein the first cavity includes seven substantially evenly spaced measurement marking indentations, wherein each measurement marking indentation includes a text stamp within the measurement marking indentation to stamp the sliceable food product with the respective measurement delineation amount.

6. The silicon mold of claim 1, wherein the first cavity and the second cavity each have a size configured to hold four ounces of moldable material.

7. The silicon mold of claim 1, further comprising:
a third cavity and fourth cavity, the third cavity and the fourth cavity each defining multiple measurement marking indentations, wherein the third cavity and the fourth cavity are connected by the interior connection surface;
a fourth cavity-to-cavity support structure attached to the exterior of the second cavity and an exterior of the third cavity and extending between the exterior of the second cavity and the exterior of the third cavity; and
a fifth cavity-to-cavity support structure attached to the exterior of the third cavity and an exterior of the fourth cavity and extending between the exterior of the third cavity and the exterior of the fourth cavity.

8. The silicon mold of claim 7, wherein the sizes of the cavities are each configured to hold four ounces of butter.

9. The silicon mold of claim 7, wherein each cavity includes seven substantially evenly-spaced substantially evenly spaced measurement marking indentations, wherein each measurement marking indentation is configured to indicate one tablespoon on a molded material made using the silicon mold.

10. The silicon mold of claim 7, further comprising:
a sixth cavity-to-cavity support structure attached to the exterior of the first cavity and the exterior of the second cavity and extending between the exterior of the first cavity and the exterior of the second cavity;
a seventh cavity-to-cavity support structure attached to the exterior of the second cavity and the exterior of the third cavity and extending between the exterior of the second cavity and the exterior of the third cavity; and
an eighth cavity-to-cavity support structure attached to the exterior of the third cavity and the exterior of the fourth cavity and extending between the exterior of the third cavity and the exterior of the fourth cavity.

11. The silicon mold of claim 1, wherein each of the measurement marking indentations have a width of approximately 1 mm to 3 mm.

12. The silicon mold of claim 1, wherein each of the measurement marking indentations have a depth of approximately 0.1 mm to 1 mm.

13. The silicon mold of claim 1, further comprising an exterior lid-support surface attached to the interior connection surface, wherein the exterior lid-support surface defines an aggregate overflow wall.

14. The silicon mold of claim 1, further comprising a detachable lid, wherein the detachable lid includes at least two lid support structures extending from a first end of the lid to a second end of the lid and at least two lid support structures extending from a third end of the lid to a fourth end of the lid.

15. The silicon mold of claim 1, further comprising a fill ridge for each cavity, wherein the fill ridge is attached to a cavity overflow wall and the fill ridge is located below the interior connection surface.

16. A mold for forming a material into a shape having one or more measurement markings thereon, the mold comprising:
four cavities each having side walls and a bottom, each cavity having multiple measurement marking indentations wherein each measurement marking indentation extends linearly across the two side walls and the bottom of the respective cavity surface and each measurement marking indentation configured to cause a visible marking on the material of the respective measurement marking indentation indicating a measurement delineation for the material directly on the material itself, wherein an exterior surface of each cavity is separated from an exterior surface of each other cavity, wherein each cavity is capable of receiving liquids having a temperature of up to five-hundred degrees Fahrenheit;
an interior connection surface, wherein the interior connection surface connects each of the cavities to one another;
at least six cavity-to-cavity support structures, wherein each cavity-to-cavity support structure is connected to the underside of the interior connection surface and is connected on one end to an exterior of one of the four cavities and connected on another end to another one of the four cavities.

17. The mold of claim 16, wherein each of the four cavities is configured to hold four ounces of moldable material.

18. A mold having a plurality of cavities for receiving a liquefied material to be hardened in the mold, the mold comprising:
a first cavity having a first cavity surface having two side walls and a bottom, wherein the first cavity defines a first measurement marking indentation and a second measurement marking indentation, wherein the first measurement marking indentation:
extends linearly across the two side walls and the bottom of the first cavity surface;
includes a first text stamp indicating the measurement delineation of the first measurement marking indentation; and
causes a first visible marking on the material in the first cavity, when the material has hardened, of the first measurement marking indentation, including the first text stamp, indicating a first measurement delineation for the first cavity material directly on the material itself; and
wherein the second measurement marking indentation:
extends linearly across the two side walls and the bottom of the first cavity surface; and
causes a second visible marking on the material in the first cavity, when the material has hardened, of the second measurement marking indentation indicating a second measurement delineation for the first cavity material directly on the material itself; and
a second cavity connected to the first cavity by an interior connection surface, wherein the second cavity has a second cavity surface having two side walls and a bottom, wherein the second cavity defines a third measurement marking indentation and a fourth measurement marking indentation, wherein the fourth measurement marking indentation:
- extends linearly across the two side walls and the bottom of the second cavity surface;
- includes a second text stamp indicating the measurement delineation of the third measurement marking indentation; and
- causes a first visible marking on the material in the second cavity, when the material has hardened, of the third measurement marking indentation, including the second text stamp, indicating a first measurement delineation for the second cavity material directly on the material itself; and wherein the fourth measurement marking indentation:
- extends linearly across the two side walls and the bottom of the second cavity surface; and
- causes a second visible marking on the material in the second cavity, when the material has hardened, of the fourth measurement marking indentation indicating a second measurement delineation for the second cavity material directly on the material itself.

19. The mold of claim 18, wherein the first measurement marking indentation has a different depth than the second measurement marking indentation, wherein the different depth indicates a different measurement delineation.

20. The mold of claim 18, wherein each of the measurement markings are indentations on the walls and bottom of the respective cavity, such that material flows into the respective indentation and, upon hardening, the material has a ridge corresponding to the indentation.

\* \* \* \* \*

UNITED STATES PATENT AND TRADEMARK OFFICE
CERTIFICATE OF CORRECTION

PATENT NO. : 10,154,646 B2  
APPLICATION NO. : 14/986021  
DATED : December 18, 2018  
INVENTOR(S) : Kisha Clark Page 1 of 1

It is certified that error appears in the above-identified patent and that said Letters Patent is hereby corrected as shown below:

In the Specification

Column 1, Lines 18, 34, 60; Column 5, Lines 34, 36, 37; Column 6, Lines 30, 31, 34; and Column 7, Line 1; Each occurrence of the word "silicon" should read --silicone--.

In the Claims

Column 8, Lines 25, 66; Column 9, Lines 3, 8, 11, 17, 20, 34, 36, 41, 42, 55, 58, 61, 65; and Column 10, Line 4; Each occurrence of the word "silicon" should read --silicone--.

Signed and Sealed this  
Eighteenth Day of August, 2020

Andrei Iancu  
*Director of the United States Patent and Trademark Office*